United States Patent [19]

King, Jr.

[11] 4,157,675

[45] Jun. 12, 1979

[54] FILLED BREAKNECK FASTENER

[76] Inventor: John O. King, Jr., 3990 N. Ivy Rd., Atlanta, Ga. 30342

[21] Appl. No.: 791,194

[22] Filed: Apr. 27, 1977

Related U.S. Application Data

[60] Continuation-in-part of Ser. No. 779,802, Mar. 21, 1977, and a continuation-in-part of Ser. No. 673,423, Apr. 5, 1976, Pat. No. 4,054,045, and a continuation-in-part of Ser. No. 694,145, Jun. 9, 1976, abandoned, which is a division of Ser. No. 542,076, Jan. 17, 1975, Pat. No. 3,962,775, said Ser. No. 779,802, is a division of Ser. No. 554,762, Mar. 3, 1975, Pat. No. 4,012,885, said Ser. No. 673,423, is a continuation of Ser. No. 542,077, Jan. 17, 1975, abandoned.

[51] Int. Cl.² .............................................. F16B 19/00
[52] U.S. Cl. ........................................ 85/5 R; 85/1 P; 85/72; 151/41.73
[58] Field of Search ............... 85/1 R, 11 P, 5 R, 5 M, 85/7, 72, 77, 78; 151/41.73; 403/408

[56] References Cited

U.S. PATENT DOCUMENTS

| | | | |
|---|---|---|---|
| 2,450,820 | 10/1948 | Wilcox | 85/19 |
| 2,531,270 | 11/1950 | Hood | 85/78 |
| 3,252,495 | 5/1966 | Waldermire | 85/1 R |
| 3,292,482 | 12/1966 | Fry et al. | 85/78 |
| 3,377,907 | 4/1968 | Hurd | 85/78 |
| 3,390,601 | 7/1968 | Summerlin | 85/78 |
| 3,578,367 | 5/1971 | Harvill | 151/41.73 X |
| 3,630,253 | 12/1971 | Sherman | 151/41.73 |
| 3,661,406 | 5/1972 | Mele | 151/41.73 X |
| 3,702,088 | 11/1972 | Schmitt | 85/77 |
| 3,779,127 | 12/1973 | Speakman | 85/7 |
| 3,915,052 | 10/1975 | Ruhl | 85/7 |
| 3,915,055 | 10/1975 | Binns | 85/77 |
| 3,941,027 | 3/1976 | Gibson et al. | 85/1 R |
| 3,951,561 | 4/1976 | Speakman | 85/7 X |

FOREIGN PATENT DOCUMENTS

725310  3/1955  United Kingdom .................. 85/10 E

Primary Examiner—Thomas J. Holko
Attorney, Agent, or Firm—B. J. Powell

[57] ABSTRACT

A reverse taper fastener including a fastner pin portion having a head and an elongate bearing section adapted to extend through holes in the work pieces where the bearing section tapers inwardly from the leading end toward the trailing end of the bearing section; and a pintail portion integrally connected to the leading end of the fastener pin portion through a breakneck section with an expansion section for expanding the holes from a diameter smaller than the bearing section to a diameter larger than same for installing the fastener where the breakneck groove around the breakneck section has been either closed or filled to form a continuous surface between the bearing section and expansion section. The disclosure also comprehends the method of manufacturing the fastener.

13 Claims, 20 Drawing Figures

FILLED BREAKNECK FASTENER

CROSS-REFERENCE TO RELATED APPLICATIONS

This application is a continuation-in-part of my copending application Ser. No. 779,802, filed Mar. 21, 1977 which is a division of my earlier application Ser. No. 544,762, filed Mar. 3, 1975; now U.S. Pat. No. 4,012,885; is a continuation-in-part of my copending application Ser. No. 673,423, filed Apr. 5, 1976 now U.S. Pat. No. 4,054,045 which is a continuation of my earlier application Ser. No. 542,077, filed Jan. 17, 1975, now abandoned; and is a continuation-in-part of my copending application Ser. No. 694,145, filed June 9, 1976, now abandoned, which is a division of my earlier application Ser. No. 542,076, filed Jan. 17, 1975, now U.S. Pat. No. 3,962,775.

BACKGROUND OF THE INVENTION

Many highly stressed fastener joints are used today, especially in the aerospace industry. Such fastener joints generally use a fastener with a head at one end, a bearing section which can be extended through the holes in the work pieces integral with the head and an engagement section at the opposite end of the bearing section which is designed to be engaged by a locking device such as a nut or collar to maintain the fastener in position. Several important criteria are usually followed in such fastener joints. One of these criteria is the maintenance of good bearing contact between the fastener and the work pieces. Another of these criteria is the keeping of the weight of the fastener joint at a minimum. Yet another of these criteria is that the resulting joint exhibit good fatigue life.

Generally, two types of fasteners are used in these fastener joints, one being a fastener having a substantially constant diameter bearing section that is placed through substantially constant diameter holes in the work pieces as is well known in the fastener art and the other being a fastener with a tapered bearing section that tapers outwardly from the engagement section toward the head which is placed in a correspondingly tapered hole through the work pieces as disclosed in U.S. Pat. Nos. 3,034,611 and 3,304,109. Both of these types of fasteners require a locking device such as a nut or collar to hold the fastener in place in the joint which has resulted in the joints formed therewith remaining relatively heavy thereby reducing the overall pay load of the structure in which they are used. Further joints made with these prior art fasteners required a significant number of installation steps in the formation of the fastener joint which maintained a relatively high installation cost.

The fatigue life of a fastener joint can be improved using a technique commonly known as coldworking wherein the hole is expanded to such an extent that the metal immediately surrounding the holes where the localized expansion occurs is stressed beyond its compressive yield point and after which the hole is permitted to return or rebound toward its original diameter to establish a compressive stress gradient immediately surrounding the hole or a technique commonly known as interference fit where the diameter of the bearing section of the fastener is greater than the initial nominal diameter of the holes in which the fastener is fitted. Because it is desirable to incorporate the coldworking and/or interference fit tooling and installation costs associated with the formation of a fastener joint, special fasteners such as those disclosed in U.S. Pat. Nos. 3,578,267 and 3,779,127 have been proposed. One of the problems in using these special fasteners is that the coldworking and/or interference fit tooling incorporated in the fastener remains an integral part of the completed fastener joint thus causing the joint to be relatively heavy. Such fasteners also still require the locking device such as a nut or collar, usually of special construction, thereon to retain the fastener in place which further keeps the joint relatively heavy.

SUMMARY OF THE INVENTION

These and other problems and disadvantages associated with the prior art are overcome by the invention disclosed herein by providing a fastener which is capable of forming a coldworked or interference fit joint yet does not require that the coldworking or interference tooling remain an integral part of the finished fastener joint to minimize the weight of the joint. Further, the requirement of a locking device such as a nut or collar to hold the fastener in place is completely eliminated in a shear application. Thus, an installation using the invention is greatly simplified, especially where no locking device is required thereby reducing the installation cost of the fastener of the invention. The invention also includes methods of manufacturing the fastener of the invention.

The apparatus of the invention includes a fastener which has an elongate bearing section adapted to extend through aligned holes in work pieces with a head integral with one end of the bearing section and an expansion section removably connected to the opposite end of the bearing section. The expansion section may be integrally connected to the bearing section through a frangible breakneck section so that it is removed from the bearing section as an incident to the installation operation. Usually, the bearing section has a reverse taper thereon from that associated with prior art tapered fasteners so that when the holes through the work pieces are expanded to allow the fastener to be installed, the holes recover to a diameter smaller than the major diameter of the bearing section to produce an interference fit. The compressive force gradient about the hole serves to lock the fastener in place and eliminate the locking device normally required to retain the fastener in the holes.

These and other features and advantages of the invention are disclosed herein and will become more clearly understood upon consideration of the following specification and accompanying drawings wherein like characters of reference designate corresponding parts throughout the several views and in which:

BRIEF DESCRIPTION OF THE DRAWINGS

FIG. 15 is an enlarged cross-sectional detail view taken along line 15 in FIG. 14; and, FIG. 16 is a view similar to FIG. 14 showing the fastener installed.

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Referring to the drawings, it will be seen that a first embodiment of the fastener 10 is illustrated in FIGS. 1-3 and 8 with the method of manufacturing same illustrated in FIGS. 4-8. The fastener 10 includes a fastener pin portion 11 and a pintail portion 12 integrally and frangibly connected to the leading end of the fastener pin portion 11. Both the fastener pin portion 11 and pintail portion 12 are coaxially arranged about a common fastener axis $A_F$. The fastener pin portion 11 includes a bearing section 15 extending from the leading end thereof toward the trailing end thereof and an enlarged head 16 at the trailing end thereof integral with the trailing end of the bearing section 15.

Figure 1:
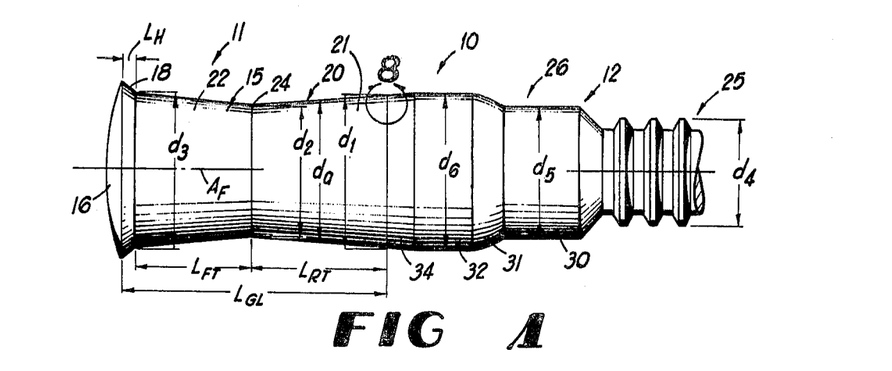
FIG. 1 is an enlarged side elevational view of one embodiment of the fastener of the invention.

The bearing section 15 defines an external bearing surface 20 thereon which is concentrically arranged about the fastener axis $A_F$ and which extends along the length of the bearing section 15. The bearing surface 20 has a leading reverse taper subsurface 21 located on the leading portion of the bearing section 15 and a trailing forward taper subsurface 22 which extends between the trailing end of the leading reverse taper subsurface 21 in the head 16 of the fastener pin portion 11. The reverse taper subsurface 21 tapers uniformly inwardly from the leading major diameter $d_1$ to a trailing minor diameter $d_2$ at the trailing end of the reverse taper subsurface 21. It will be noted that the reverse taper subsurface 21 has a length $L_{RT}$ as will become more apparent. It will also be noted that the trailing forward taper subsurface 22 tapers uniformly outwardly from the minor diameter $d_2$ at its leading end to a trailing secondary major diameter $d_3$ at its trailing end where it joins with the head 16. The forward taper subsurface 22 has a length $L_{FT}$ as will become more apparent. The relationship between the diameters $d_1$–$d_3$ as well as the relationship between the lengths $L_{RT}$ and $L_{FT}$ will become more apparent.

The enlarged head 16 of the fastener pin portion 11 corresponds generally in configuration to a countersunk type head in that the underside 18 of the head 16 tapers outwardly from the trailing end of the forward taper subsurface 22. It will be noted, however, that the head 16 is considerably smaller than that associated with conventional countersunk heads for fasteners as will become more apparent. It is to be understood however, that different head styles can be used with the fastener 10 without departing from the scope of the inventive concept.

The fastener pin portion 11 thus has an effective maximum grip length $L_{GL}$ which is longer than the sum of the lengths $L_{RT}$ and $L_{FT}$ corresponding to that normally associated with fasteners having countersunk type heads. For an exposed head type fastener pin portion, the maximum grip length would be equal to the sum of the lengths $L_{RT}$ and $L_{FT}$.

Figure 8:
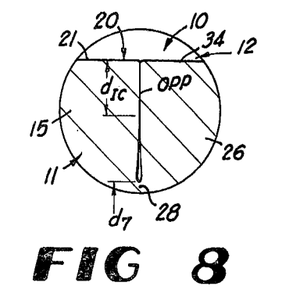
FIG. 8 is an enlarged cross-sectional detail view taken along line 8 in FIG. 1.

The pintail portion 12 of the fastener 10 has a pulling section 25 on the leading end thereof and an expansion section 26 at the trailing end thereof. The trailing end of the expansion section 26 is integrally connected to the leading end of the bearing section 15 on the fastener pin portion 11 through a breakneck section 28 as best seen in FIG. 8. The pulling section 25 on the pintail portion 12 has an effective length such that the pulling section 25 will extend through holes in work pieces sufficiently for the fastener 10 to be installed as will become more apparent. The pulling section 25 also has a configuration normally associated with lockbolt type fasteners and is illustrated with alternating ridges and grooves to be gripped by the pulling nose assembly of a conventional lockbolt installation tool as will become more apparent. The pulling section 25 has a major diameter $d_4$ which is usually smaller than the diameters $d_1$–$d_3$ as will become more apparent.

The expansion section 26 defines a generally cylindrical pilot surface 30 on the leading end thereof concentric about the fastener central axis $A_F$ with an outside diameter $d_5$ which is sufficient to center the fastener 10 in the holes through the work pieces when the pilot surface 30 extends therein as will become more apparent. Usually, the diameter $d_5$ of the pilot surface 30 is in the order of 0.001 inch (0.0254 mm) less than the initial hole diameter as will become apparent. The expansion section 26 also includes a leading expansion surface 31 concentric about the central axis $A_F$ and extending from the trailing end of the pilot surface 30 out to a major expansion diameter $d_6$ at its trailing end. The major expansion diameter $d_6$ is usually greater than the initial hole diameter through the work pieces by the amount which it is desired to expand the holes as will become more apparent. It will also be noted that the major expansion diameter $d_6$ is greater than the major diameter $d_1$ of the bearing surface 20 as will become more apparent. The expansion section 26 also has an intermediate land surface 32 which joins with the trailing end of the expansion surface 31 and is usually cylindrical with the major expansion diameter $d_6$. The trailing end of the expansion section 26 defines a trailing contraction surface 34 thereon which joins with the trailing end of the intermediate land surface 32 and tapers inwardly to the major bearing surface diameter $d_1$ where they are in juxtaposition. While different shapes may be provided for the leading expansion surface 31, the surface 31 is illustrated as semi-ellipsoidal in shape with the included angle between the tangent to the surface 31 at any point thereon decreases from the leading toward the trailing end of the surface 31 to produce an exponentially increasing mechanical advantage at the surface 31/hole interface from the leading to the trailing end of the surface 31. This serves to minimize the frictional interface between the surface 31 and the work pieces at the holes which, in turn, reduces the force required to move the expansion surface 31 through the holes as will become more apparent.

Figure 2:
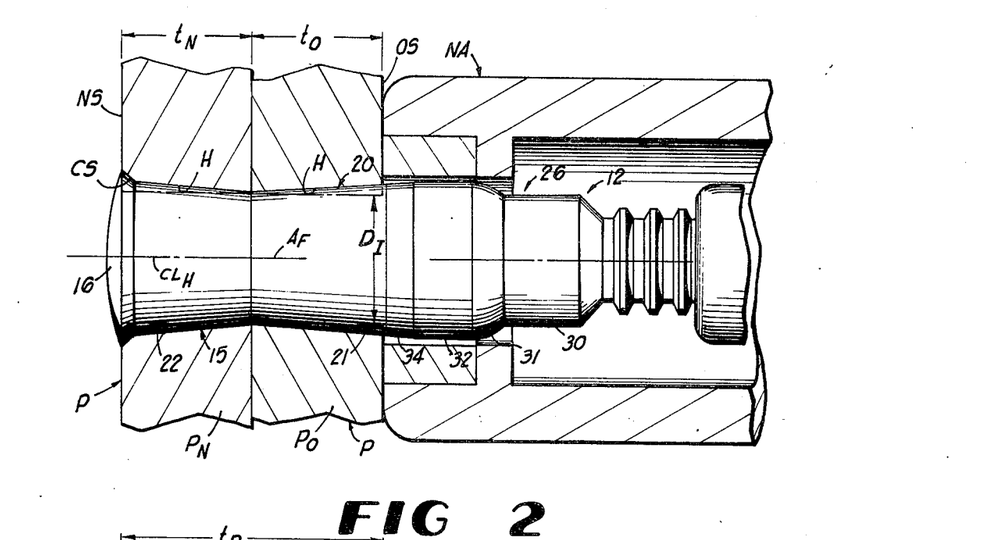
FIG. 2 is a view similar to FIG. 1 showing the fastener being installed.
Figure 3:
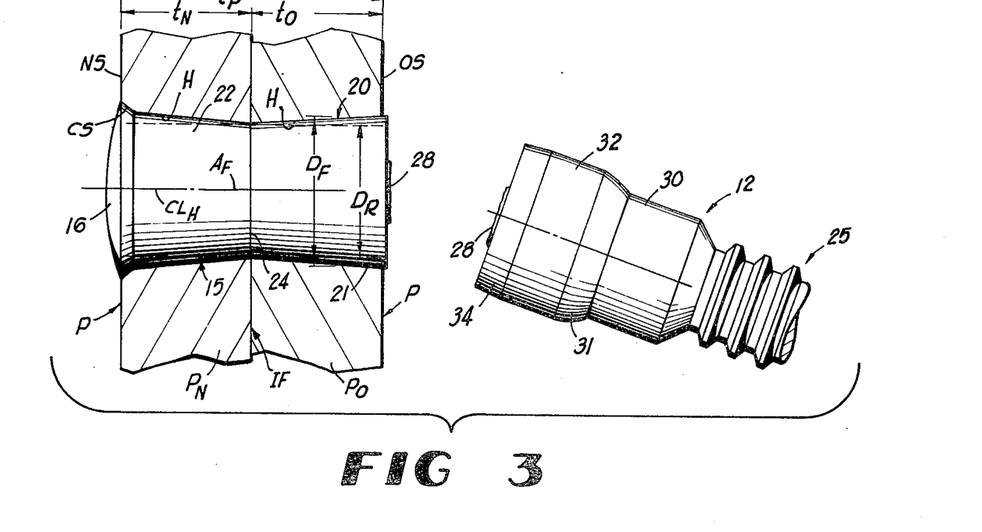
FIG. 3 is a view similar to FIG. 1 showing the fastener installed.

The installation of the fastener 10 is illustrated generally in FIGS. 2 and 3. The fastener 10 is installed using a conventional lockbolt installation tool, the nose assembly NA of which is partly seen in FIG. 2, to pull the fastener 10 into holes H through work pieces P as will become more apparent. The head 16 has an effective working length $L_H$ as seen in FIG. 1.

There is a definite relationship between the diameters $d_1$–$d_3$ of the bearing section 15 of the fastener pin portion 11, the maximum expansion diameter $d_6$ of the expansion section 26 on the pintail portion 12, the diameter $d_5$ of the pilot surface 30 on the expansion section 26, the initial hole diameter $D_I$ of the holes H seen in FIG. 2, the recovered hole diameter $D_R$ of the holes H toward which the material tries to recover after passage of the expansion section 26 therethrough seen by dashed lines in FIG. 3 and the final interference average hole diameter $D_F$ when the fastener 10 is installed in the holes as seen in FIG. 3. Usually, the diameters $d_1$–$d_3$ of the bearing surface 20 on the fastener pin portion 11 are the controlling diameters since their average diameter $d_a$ seen in FIG. 1 corresponds generally to that of a standard size fastener. Thus, if it is desirable to place the bearing section 15 of the fastener pin portion 11 into an average interference fit of a prescribed amount, such as 0.002 inch (0.0508 mm), then the recovered hole diameter $D_R$ must be 0.002 inch (0.0508 mm) less than the average diameter $d_a$ of the bearing surface 20 on the fastener pin portion 11. When the material of the work pieces P is known, the recovered hole diameter $D_R$ can be reasonably predicted and thus the maximum expansion diameter $d_6$ of the expansion surface 31 on the expansion section 26 can be determined. This major expansion diameter $d_6$ can be calculated to be that amount larger than the recovered hole diameter $D_R$ to make the recovered hole diameter $D_R$ the desired amount smaller than the average bearing diameter $d_a$ of the fastener pin portion 11 to achieve the desired interference fit. Once the major expansion diameter $d_6$ is determined, the initial hole diameter $D_I$ can be determined and is that amount less than the maximum expansion of the holes as determined by the major expansion diameter $d_6$ by which it is desired to expand the holes H. If it is desirable to coldwork the holes, the amount the holes H are to be expanded is set by the available coldworking data. Once the initial hole diameter $D_I$ is determined, this determines the diameter $d_5$ of the pilot surface 20 on the expansion section 26 since the diameter $d_5$ must be sufficiently small to be slidably received in the holes at diameter $D_I$ yet sufficiently large to maintain the fastener central axis $A_F$ coaxial with the hole centerline $CL_H$. It is also understood that the differences between the major diameters $d_1$ or $d_3$ and the minimum diameter $d_2$ of the bearing surface 20 is limited somewhat by the amount of recovery of the holes H after passage of the expansion section 26 therethrough, especially if a significant interference fit is desired. Usually, the pulling section diameter $d_4$ corresponds to that of a lockbolt type fastener of one standard diameter smaller than that associated with a lockbolt type fastener of the average bearing diameter $d_a$. This permits the use of standard lockbolt type installation tooling while providing an adequate clearance between the holes H and pulling section 25. For instance, if the average diameter $d_a$ were 5/16 inch for the bearing surface 20 to be installed in the holes through the work pieces and it is desirable that the bearing section 15 is to be in an average interference fit of 0.002 inch (0.0508 mm) through 7075-T6 aluminum, then the major expansion diameter $d_6$ should be 0.315 inch (8.001 mm) if coldworking is desired to produce an unrestrained recovered hole diameter $D_R$ of 0.308 inch (7.823 mm) where the initial hole diameter $D_I$ is 0.300 inch (7.620 mm). Thus, the diameter $d_5$ of the pilot surface 30 on the expansion section 26 should be just slightly less than the initial hole diameter $D_I$ or nominally 0.299 inch (7.595 mm). Since it is desirable to have the entire hole surface in bearing contact with both the forward and reversed tapered subsurfaces 21 and 22 of the overall bearing surface 20 on the fastener pin portion 11, the leading major diameter $d_1$ at the leading end of the reversed taper subsurface 21 and the trailing secondary major diameter $d_3$ at the trailing end of the forward taper subsurface 22 should be about 0.311 inch (7.899 mm) and the minor diameter $d_2$ should be about 0.309 inch (7.849 mm) to give an average interference fit of 0.002 inch (0.0508 mm). Normally, the relationship between the major diameters $d_1$ and $d_3$ and the minor diameter $d_2$ will remain the same regardless of the grip length of the fastener 10. Accordingly, the pulling section diameter would be about 0.243 inch (6.172 mm). For sake of illustration, the relative dimensions have been exaggerated in the drawings.

As will best be understood by reference to FIG. 2, it will be seen that the pulling section 25 on the pintail portion 12 of fastener 10 is inserted through the holes H in the work piece until the pilot surface 30 has entered the holes H on the near side NS of the work pieces P and the pulling section 25 projects out from the offside OS of the work pieces P. The nose assembly NA of a lockbolt installation tool is inserted over the pulling section 25 of pintail portion 12 and activated to start pulling the expansion section 26 through the holes immediately followed by the bearing surface 20 on the fastener pin portion 11. It will be noted that that end of the holes H at the near side NS of the work pieces P has been appropriately countersunk as indicated at CS to conform to the underside of the head 16. The installation tool through the nose assembly NA pulls the fastener 10 into the holes H with the holes H recovering into bearing contact with the leading reverse tapered surface 21 and the forward tapered subsurface 22 on the bearing surface 20. Finally, the fastener is pulled completely into the holes until the underside of the head 16 engages the countersink CS in the work pieces P so that the fastener pin portion 11 is now installed in the holes H as seen in FIG. 2. The installation tool may also be used to break the pintail portion 12 from the fastener pin portion 11 by fracturing the breakneck section 28 or the nose assembly NA may release the pintail portion 12 and then the pintail portion 12 separated from the fastener pin portion 11 by exerting a lateral force on the pintail portion 12 as illustrated in FIG. 3 to fracture the breakneck section 28. This completes the fastener joint FJ as seen in FIG. 3. It is further to be understood that the fastener 10 may be driven into the holes H.

As best seen in FIG. 3, the grip length $L_{GL}$ of the fastener pin portion 11 is related to the total thickness $t_P$ of the work pieces P. The length $L_{RT}$ of the reverse taper subsurface 21 is usually related to the thickness $t_o$ of the offside work pieces $P_o$ and the length $L_{FT}$ of the forward taper subsurface 22 is usually related to the thickness $t_N$ of the nearside work piece $P_N$, especially when only two work pieces P are used in the fastener joint FJ as illustrated in FIG. 3. The lengths $L_{RT}$ and $L_{FT}$ are usually selected to locate the juncture 24 between the reverse and forward taper subsurfaces 21 and 22 at the work piece interface IF between the work pieces P. Thus, in a two work piece joint as seen in FIG. 3, the length $L_{RT}$ will usually be slightly longer than the thickness $t_o$ of the offside work piece $P_o$ since the leading end of the bearing section 15 usually projects slightly from the offside OS of the offside work piece $P_o$. The length $L_{FT}$ of the forward taper subsurface 22 is selected so that the sum of the working length $L_H$ of head 16 and the length $L_{FT}$ is nominally equal to the thickness $t_N$ of the nearside work piece $P_N$.

Because the forward and reverse taper subsurfaces 22 and 21 are nominally larger than the unrestrained recovered hole diameter $D_R$ as seen by the dashed lines in FIG. 3 toward which the material of the work pieces P force the holes H, the subsurfaces 21 and 22 are tightly clamped in holes H by the reactive force of the material of the work pieces. The reactive force of the nearside work piece $P_N$ on the forward taper subsurface 22 tries to force the fastener pin portion 11 out of the work pieces P from the near side NS thereof while the reactive force of the offside work piece $P_o$ tries to force the fastener pin portion 11 out of the work pieces P from the offside OS thereof. The net effect is that, not only is the fastener pin portion 11 tightly clamped in the holes H, the work pieces P are also tightly clamped together at their interface IF.

Experimental data has shown that the force required to move an expansion type tapering surface through holes is inversely proportional to the slope. Because the average slope of the expansion surface 31 on the expansion section 26 is much greater than the slope of the reverse taper subsurface 21 on the bearing section 15 of the fastener pin portion 11, it will be seen that the force required to remove the fastener pin portion 11 from the holes by movement in the direction of the head is significantly greater than the force required to force the fastener pin portion 11 into the holes with the expansion section 26 immediately preceeding same as the fastener pin portion 11 is installed. Thus, it will be seen that if the tension load on the joint is low such as in a shear application, the need for a locking device such as a nut or swagable collar is eliminated.

When more than two work pieces P are incorporated in the fastener joint, the location of the juncture 24 between the subsurfaces 21 and 22 would be appropriately changed. The juncture 24 will normally be located at one of the interfaces between the work pieces and usually at the interface of the thickest work piece in the fastener joint. Also, the taper of the subsurfaces 21 and 22 may be varied for each work piece.

Figure 4:
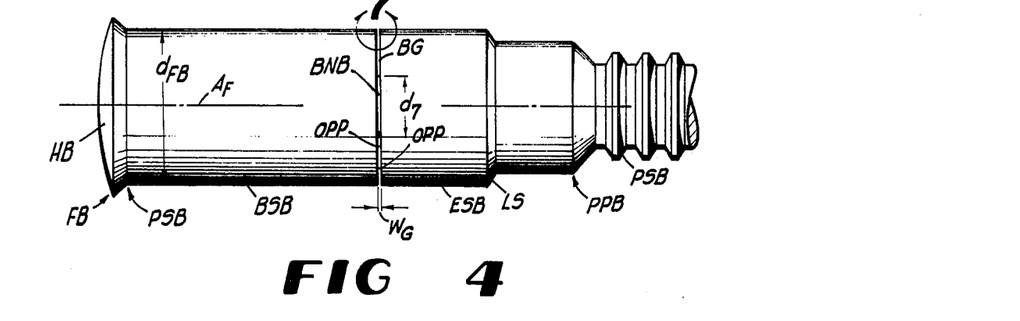
FIG. 4 is an enlarged side elevational view of a fastener blank used to make the fastener of FIG. 1.
Figure 5:
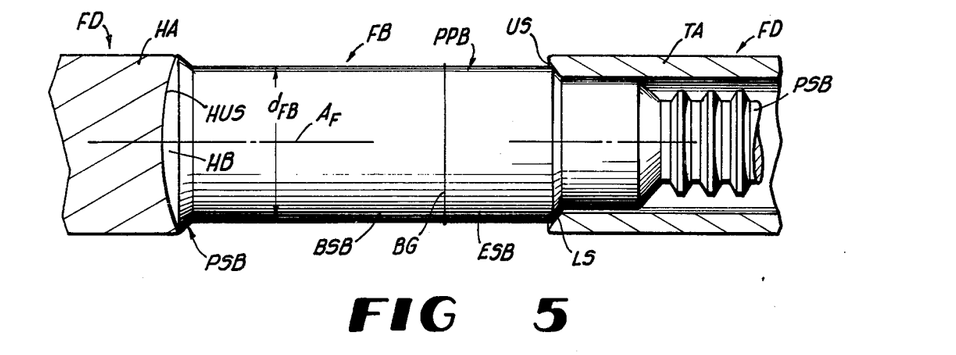
FIG. 5 is a view similar to FIG. 4 after the breakneck groove in the fastener blank has been closed.
Figure 6:
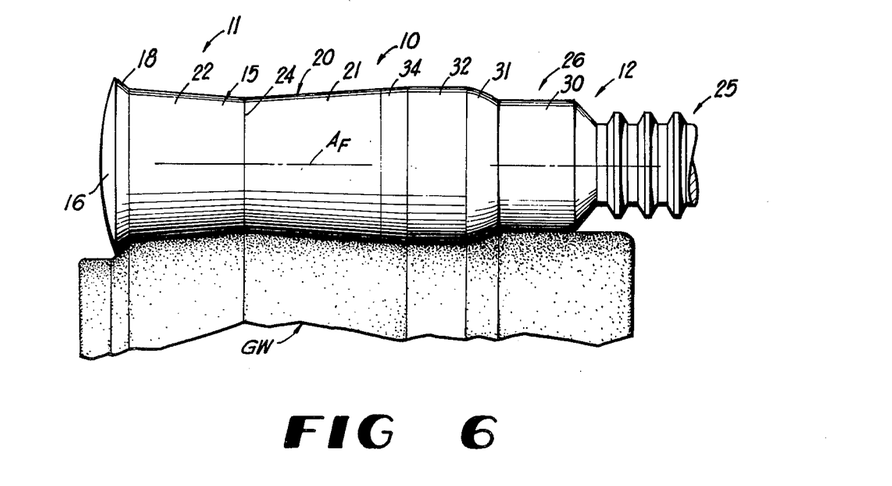
FIG. 6 is a view similar to FIG. 5 showing the fastener of FIG. 1 being formed from the fastener blank of FIG. 5.

To better understand the formation and operation of the breakneck section 28, attention is directed to FIGS. 4-8. FIG. 4 illustrates the initial fastener blank FB from which the fastener 10 is made. FIG. 5 shows an intermediate step in the formation of the fastener 10 from the fastener blank FB and FIG. 6 shows the final formation of the fastener 10 from the fastener blank FB.

The initial fastener blank FB as seen in FIG. 4 is usually made with the material of the fastener in an initial relatively soft or annealed condition to permit easier formation of the fastener blank FB. As seen in FIG. 4, the fastener blank FB corresponds very generally to the various portions of the fastener 10 in that the fastener blank FB has a head blank HB at the trailing end thereof, a bearing section blank BSB integral with the head blank HB to form the fastener pin portion blank FPP. The pintail portion blank PPB has an expansion section blank ESB integral with the leading end of the bearing blank BB through a breakneck section blank BNB and a pulling section blank PSB integral with the leading end of the expansion section blank ESB. Usually, the head blank HB is formed in a heading operation and the pulling section blank PSB is formed in a rolling operation so that the pulling section blank PSB needs no further work to produce its final form.

Figure 7:
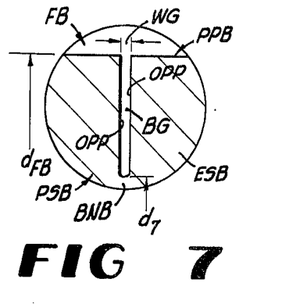
FIG. 7 is an enlarged cross-sectional detail view taken along line 7 in FIG. 4.

It will be noted that the trailing end of the expansion section blank ESB is spaced from the leading end of the bearing section blank BSB but connected therewith through the breakneck section blank BNB to form a breakneck groove BG between the leading end of the bearing section blank BSB and the trailing end of the expansion section blank ESB about the breakneck section blank BNB as seen in FIGS. 4 and 7. It will be noted in FIGS. 4 and 7 that the breakneck groove BG is oriented normal to the central axis $A_F$ of the fastener blank FB with a width $w_G$. The breakneck groove BG is usually formed by a cutting or rolling operation which can be easily automated and the width $w_G$ should be as small as possible as will become more apparent. Usually, the width $w_G$ is limited by the particular metal forming operation with which the breakneck groove BG is formed. It will be noted that the bearing section blank BSB and the expansion section blank ESB have a common diameter $d_{FB}$ (FIGS. 4 and 7) which is usually at least as great as the major expansion diameter $d_6$ that the finished expansion section 26 is to have on the fastener 10, and is usually slightly larger than this diameter as will become more apparent.

As seen in FIG. 5, the fastener blank FB is placed in an appropriate forming device FD which is capable of axially forcing the leading end of the bearing section blank BSB and the trailing end of the expansion section blank ESB toward each other so that the peripheral portions of the leading end of the bearing section blank BSB and the trailing end of the expansion section blank ESB are forced into intimate contact with each other. This will be seen also in FIG. 8 where the outer peripheral portions OPP are illustrated as intimately forced into contact with each other for a distance $d_{IC}$ inboard from the eventual outer periphery of the leading end of the bearing surface on the finished fastener 10 and the trailing end of the contraction surface 34 on the expansion section 26. It is not necessary that the inboard end of the breakneck groove BG be actually closed. While a number of different forming devices FD can be used, a forming device FD is illustrated in FIG. 5 as including a tubular anvil TA which fits over the pulling section blank PSB of the pintail portion PPB to engage the leading shoulder LS on the expansion section blank ESB that will eventually be formed into the leading expansion surface 31 on the finished fastener 10 and a head anvil HA. It will be seen that the tubular anvil TA has an annular upsetting surface US on that end facing the leading shoulder LS which is complimentary to the leading shoulder LS on the expansion section blank ESB. The head anvil HA is illustrated engaging the free end of the head blank HB and has a head upsetting surface HUS which is complimentary to the shape of the head blank HB so that when the head anvil HA and the tubular anvil TA are driven toward each other with the fastener blank FB therebetween, a sufficient force will be generated to force closure of the breakneck groove BG as seen in FIG. 8. It is anticipated that this force to close the breakneck groove BG will probably be a striking force.

After the breakneck groove BG has been closed, as illustrated in FIGS. 5 and 8, the fastener blank FB is then ground into final shape as illustrated in FIG. 6 using appropriate grinding techniques. Usually, before the fastener blank FB is finally ground, it is hardened in an appropriate manner to its final strength. While FIG. 6 illustrates the grinding of the fastener blank FB to its final shape to form the fastener 10 with a single grinding wheel GW, that has been appropriately shaped, it is to be understood that multiple grinding steps may be used to grind the fastener blank FB to its final shape. FIG. 8 is actually taken from the finished fastener 10 along the line illustrated in FIG. 1 so that it will be seen that the outer peripheral portions OPP of the leading and trailing end surfaces respectively of the bearing section 15 and the expansion section 26 are still in intimate contact with each other for the distance $d_{IC}$ inboard of the junction of the reverse taper subsurface 21 and the contraction surface 34 on the expansion section 26. Even though these outer peripheral portions OPP are in intimate contact with each other, the axial load between the fastener pin portion and pintail portion 12 is carried through the breakneck section 28 so that the breakneck section 28 can be fractured to separate the pintail portion 12 from the fastener pin portion 11 as explained hereinbefore. It will be seen that the breakneck section 28 has a diameter $d_7$ which is less than the minimum diameter of any other portion of the fastener 10 so that a fracture of the breakneck section 28 is assured.

Intimate closure of the breakneck groove BG is critical in the formation of the fastener 10 since any opening at the juncture between the bearing surface 20 on fastener pin portion 11 and the contraction surface 34 on the pintail portion 12 will cause undesirable removal of work piece material about holes H as fastener 10 is installed. Further, by simultaneously grinding both the bearing surface 20 and the contraction surface 34, irregularities at the closed breakneck groove are eliminated.

Figure 9:
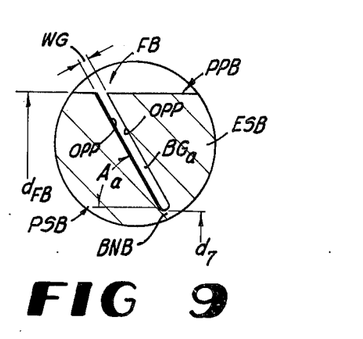
FIG. 9 is a cross-sectional detail view similar to FIG. 7 showing an alternate breakneck groove.
Figure 10:
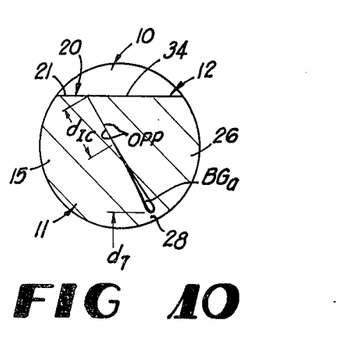
FIG. 10 is a cross-sectional detail view similar to FIG. 8 showing the breakneck groove of FIG. 9.

FIGS. 9 and 10 illustrate the formation of an alternate configuration of the breakneck groove designated $BG_a$ in FIGS. 9 and 10. The difference between the groove $BG_a$ and groove BG is that groove $BG_a$ angles rearwardly from its inboard end toward its outboard end toward the trailing end of the fastener pin portion 11 to define an included acute angle $A_a$ with respect to the fastener axis $A_F$. The groove $BG_a$ has an initial width $w_G$ similar to groove BG as seen in FIG. 9 and is closed as seen in FIG. 10 similarly to groove BG as already explained. Thus, the outer peripheral portions OPP of the leading and trailing end surfaces respectively of the bearing section 15 and the expansion section 26 are forced into intimate contact with each other for the distance $d_{IC}$ from the outer periphery thereof as explained for the groove BG thereby leaving breakneck section 28. The operation thereof is similar to the groove BG.

Figure 11:
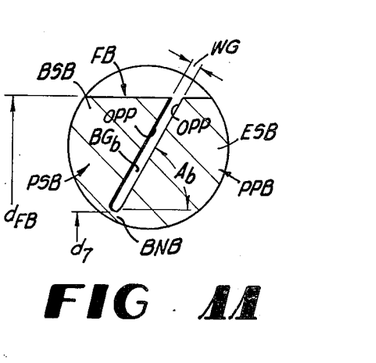
FIG. 11 is a cross-sectional detail view similar to FIG. 7 showing yet another alternate breakneck groove.
Figure 12:
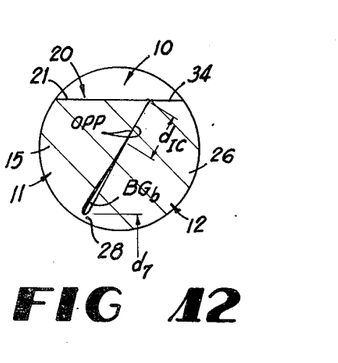
FIG. 12 is a cross-sectional detail view similar to FIG. 8 showing the breakneck groove of FIG. 11.

FIGS. 11 and 12 illustrate the formation of another alternate configuration of the breakneck groove designated BG in FIGS. 11 and 12. The difference between the groove BG and grooves BG and $BG_a$ is that groove $BG_a$ angles forwardly from its inboard end toward its outboard end toward the leading end of the fastener 10 to define an included acute angle $A_L$ with respect to the fastener axis $A_F$. The groove $BG_a$ also has an initial width $w_G$ similar to groove BG as seen in FIG. 11 and is closed as seen in FIG. 12 similarly to groove BG as already explained. Thus, the outer peripheral portions OPP of the leading and trailing end surfaces respectively of the bearing section 15 and the expansion section 26 are forced into intimate contact with each other for the distance $d_{IC}$ from the outer periphery thereof as explained for the groove BG thereby leaving breakneck section 28. The operation thereof is similar to the grooves BG and $BG_a$.

Figure 13:
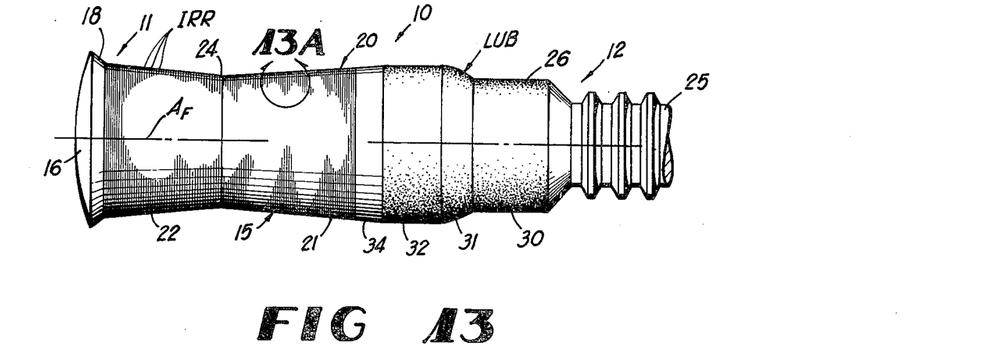
FIG. 13 is a side elevational view similar to FIG. 1 showing the lubricant thereon.

One of the problems that has been encountered in installing fasteners 10 is that a lubricant needs to be used on the expansion section 26 to prevent galling of the hole surface during installation as well as reducing the force required to install the fastener 10. Any lubricant remaining in the holes after installation may create undesirable problems, however. One of these problems is that such lubricant may increase the likelihood of corrosive chemical reactions between the fastener and the work pieces. Another of these problems is that such lubricant may reduce the holding capability of the reverse and forward taper subsurfaces 21 and 22. FIG. 13 illustrates a fastener 10 which has been formed to overcome these problems. The pilot, expansion and land surfaces 30, 31 and 32 have been coated with a conventional dry film lubricant referenced LUB such as molybdenum disulfide, graphite or lead oxide. Other lubricants may also be used.

Figures 13A, 14:
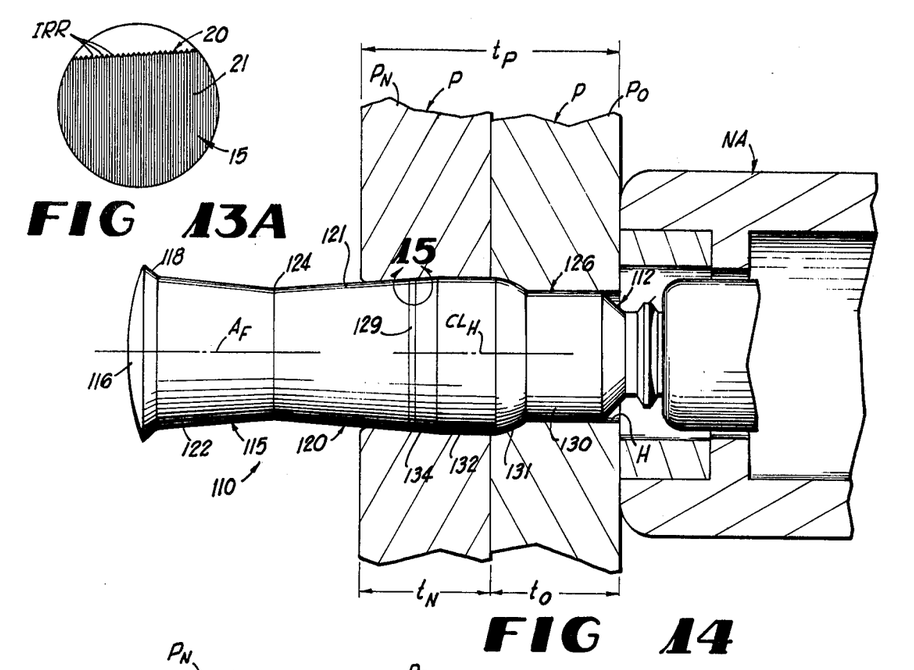
FIG. 13A is a greatly enlarged view of a portion of the fastener bearing surface taken generally along line 13A in FIG. 13.
FIG. 14 is a view similar to FIG. 2 illustrating an alternate embodiment of the fastener.

The reverse and forward taper subsurfaces 21 and 22, however, do not have a lubricant applied thereto. Further, the reverse and forward taper subsurfaces 21 and 22 are not as smoothly finished as required for the expansion surface 31 on the expansion section 26. The expansion surface 31 needs to be as smooth as economically feasible so that the holes will be smoothly expanded as the expansion surface 31 passes therethrough. The same considerations apply to the land surface 32. In addition, these surfaces are also covered with the lubricant. Because the expanding force on the holes is relaxing as the holes close in around the forward and reverse taper subsurfaces 21 and 22, however, the smoothness of these surfaces is not as critical as that of the expansion surface 31 and the land surface 32. As best seen in FIG. 13A, the forward and reverse taper subsurfaces 21 and 22 are formed so that they have circumferentially extending annular irregularities IRR therein which lie in planes generally normal to the fastener axis AF. These surfaces can be easily formed and are generally inherent in turning operations or rough grinding operations where the fastener is rotated about the fastener axis AF as the subsurfaces 21 and 22 are formed. While these irregularities IRR do not appreciably effect the installation of the fastener pin portion 11 in the work pieces P, once the holes have rebounded into bearing contact with the irregularities IRR in the subsurfaces 21 and 22, the fastener pin portion 11 is more positively held in the holes H. Thus, it will be seen that the fastener illustrated in FIG. 13 would be installed and used similarly to the fastener shown in FIG. 1.

SECOND EMBODIMENT

Figures 15, 16:
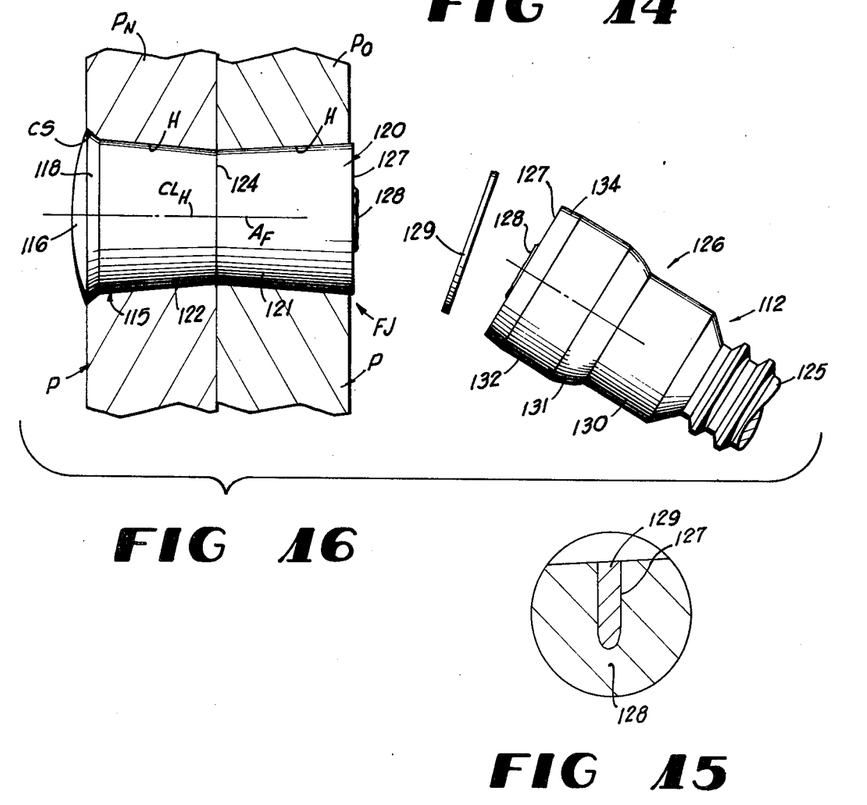
Figure 17:
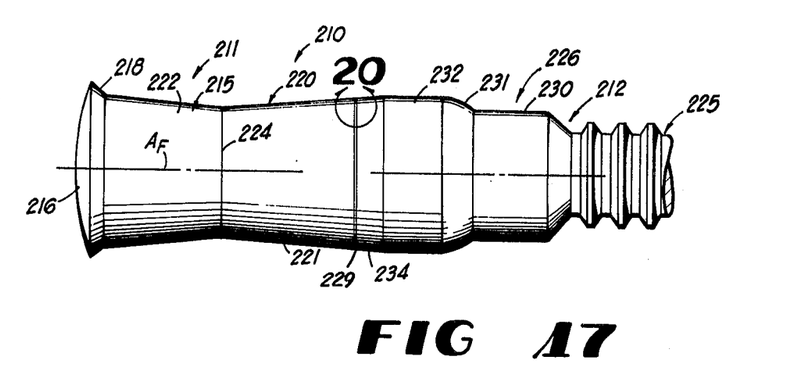

A second embodiment of the fastener is illustrated in FIGS. 14–16 and is designated generally as fastener 110. Those portions of the fastener 110 common to the fastener 10 have the corresponding reference numerals applied thereto displaced by 100. Thus, it will be seen that the fastener 110 includes a fastener pin portion 111 and a pintail portion 112 which are integral with each other through a breakneck section 128. The difference between the fastener 110 and the fastener 10 resides in the breakneck section and the structure by which the leading end of the reverse taper subsurface 121 is joined to the trailing end of the contraction surface 134 on the trailing end of the expansion section 126. As best seen in FIG. 15, it will be seen that the breakneck groove 127 of the fastener 110 is not closed as set forth for the fastener 10, but rather, has a filler 129 filling the breakneck groove 127. The breakneck groove 127 is filled with the filler 129 prior to the finishing operation in which the contraction surface 134 on expansion section 126 and the leading reverse taper subsurface 121 on the bearing section 115 is performed. The material of the filler 129 should be sufficiently strong not to be contracted as the fastener 110 is moved into the holes H through the work pieces, but rather, maintains a continuous surface between the contraction surface 134 and the reverse taper subsurface 121. The material of the filler 129 may be a deformed metal or may be made from a sintered material such as a metal oxide or other ceramic.

FIG. 14 shows the fastener 110 being installed through the holes H in the work pieces P similarly to the fastener 10 using an installation tool with a nose assembly NA. FIG. 16 shows the fastener pin portion 111 of the fastener 110 finally installed in the work pieces P and the frangible breakneck section 128 broken to release the pintail portion 112 from the fastener in portion 111. It will also be noted that this releases the filler 129 which falls freely away from the fastener pin portion 11.

THIRD EMBODIMENT

FIGS. 17–20 illustrate a third embodiment of the fastener which has been designated by the numeral 210. Those portions of the fastener 210 corresponding to the fastener 10 have corresponding reference numerals applied thereto displaced by 200. Thus, it will be seen that the fastener 210 has a fastener pin portion 211 and a pintail portion 212 integrally connected to each other through a breakneck section 228 best seen in FIGS. 18–20. The basic difference between the fastener 210 and the fastener 10 is that the fastener 210 has an upset filler 229 filling the breakneck groove 227, the formation thereof being best illustrated in FIGS. 18–20.

Figure 18:
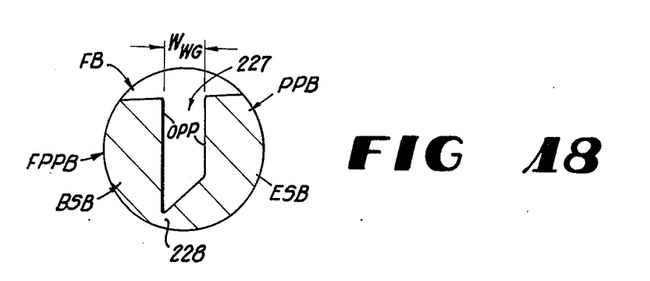
Figure 19:
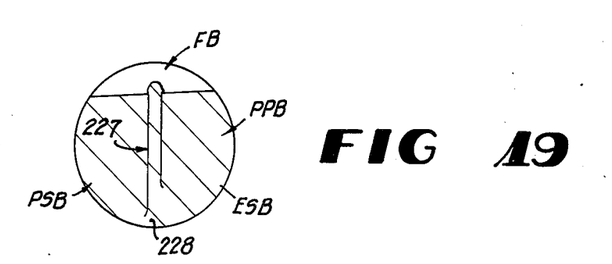
Figure 20:
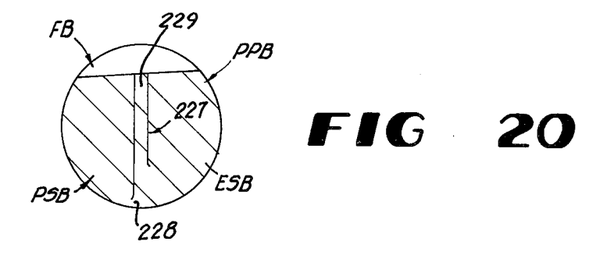

FIG. 20 is an enlarged portion of the finished fastener 210 showing the upset filler 229 filling the breakneck groove 227. FIG. 18 is a similar view of the fastener blank FB from which the fastener 210 is eventually made. FIG. 19 is a view similar to FIG. 20 showing the intermediate step in the final formation of the upset filler 229 after the breakneck groove 227 has been filled by axially forcing the bearing section blank BSB and the pintail portion blank PPB together to cause the material of the fastener blank FB in the breakneck section 228 to be upset sufficiently to overfill the breakneck groove 227 with the material of the breakneck section 228 while the breakneck groove 227 is made narrower. It will be noted that the initial breakneck groove 227 formed in the fastener blank FB as seen in FIG. 18 has a width $w_{WG}$ which is wider than the width of the breakneck groove BG formed in the fastener blank FB associated with the fastener 10. The width $w_{WG}$ of the breakneck groove 227 is sufficient to permit the material of the breakneck section 228 to be upset into and fill the narrowed breakneck groove 227 as seen in FIG. 19. The bearing section blank BSB and the pintail portion blank PPB are forced together similarly to that illustrated for the fastener blank FB associated with the fastener 10. The force urging the fastener pin portion blank FPPB toward the pintail portion blank PPB will probably be greater than that associated with the fastener 10 and must be sufficient to upset the breakneck section 228. The upsetting of the breakneck section 228 is assured since the axial load urging the fastener pin portion blank FPPB toward the pintail portion blank PPB is concentrated in the breakneck section 228. After the breakneck section 228 has been upset into the narrowed breakneck groove 227 as illustrated in FIG. 19 to form the upset filler 229, the fastener blank FB is then finished similarly to the fastener 10 to finish the outer surface of the upset filler 229 flush with the finished contraction surface 234 on the expansion section 226 and the leading end of the reverse taper subsurface 221 on the fastener pin portion 11. The fastener 210 is installed similarly to fastener 10.

I claim:

1. A fastener with a central axis for connecting work pieces with aligned holes therethrough of an initial diameter comprising:

a fastener pin portion including an elongate bearing section having a leading end and a trailing end adapted to extend through the holes and an enlarged head integral with the trailing end of said bearing section adapted to engage one side of the work pieces about the holes, said bearing section defining an exterior bearing surface thereon concentric about the fastener central axis and tapering inwardly along said bearing section from a leading major bearing diameter adjacent the leading end of said bearing section larger than the initial diameter of the holes in the work pieces to a trailing minor bearing diameter trailing said leading major bearing diameter and smaller than said leading major bearing diameter; and, a pintail portion integrally connected to the leading end of said bearing section of said fastener pin portion and coaxial therewith, said pintail portion including an expansion section defining an expansion surface thereon having a leading minor expansion diameter at least as small as the initial hole diameter and a major expansion diameter larger than the leading major bearing diameter of said bearing surface trailing the leading minor expansion diameter so that, when said expansion section on said pintail portion is forced through the holes, leading minor expansion diameter first, said expansion section will expand the holes from the initial hole diameter to the trailing major expansion diameter without deformation of said expansion section; and a reduced diameter frangible breakneck section integrally joining the leading end of said bearing section of said fastener pin portion with the trailing end of said expansion section of said pintail portion, said bearing section and said expansion section defining a breakneck groove about said breakneck section, said breakneck groove having been closed by forcing the leading end of said bearing section and the trailing end of said expansion section into intimate contact with each other about the bearing and expansion surfaces during manufacture of said fastener and prior to use so that said closed breakneck groove appears as a line separation between said expansion and bearing surfaces, said bearing and expansion surfaces having been finished across the closed breakneck groove so that said expansion and bearing surfaces are essentially continuous across the closed breakneck groove to prevent any material of the work pieces about the holes from being removed in the closed breakneck groove as the closed breakneck groove passes through the holes while under expansion.

2. The fastener of claim 1 wherein said breakneck groove is oriented generally normal to the fastener central axis.

3. The fastener of claim 1 wherein said breakneck groove defines an acute angle with respect to the fastener central axis.

4. The fastener of claim 3 wherein said breakneck groove angles toward said expansion section from its inboard end toward its outboard end.

5. The fastener of claim 3 wherein said breakneck groove angles toward said bearing section from its inboard end toward its outboard end.

6. The fastener of claim 1 wherein said pintail portion further includes a pulling section integral with the leading end of said expansion section and coaxial therewith, said pulling section having a major outside diameter such that said pulling section will slidably pass through the holes at their initial diameter.

7. The fastener of claim 1 further including a dry film lubricant substantially covering said expansion surface and wherein said bearing surface defines a plurality of circumferentially extending irregularities therein generally normal to the fastener central axis.

8. A fastener with a central axis for connecting work pieces with aligned holes therethrough of an initial diameter comprising:
a fastener pin portion including an elongate bearing section having a leading end and a trailing end adapted to extend through the holes and an enlarged head integral with the trailing end of said bearing section adapted to engage one side of the work pieces about the holes, said bearing section defining an exterior bearing surface thereon concentric about the fastener central axis, extending from the leading end of said bearing section toward the trailing end of said bearing section, and having a bearing diameter adjacent the leading end of said bearing section larger than the initial hole diameter; and,
a pintail portion integrally connected to the leading end of said bearing section of said fastener pin portion and coaxial therewith, said pintail portion including an expansion section defining an expansion surface thereon having a leading minor expansion diameter at least as small as the initial hole diameter and a major expansion diameter larger than the initial hole diameter and the bearing diameter of said bearing surface trailing the leading minor expansion diameter so that, when said expansion section on said pintail portion is forced through the holes, leading minor expansion diameter first, said expansion section will expand the holes from the initial hole diameter to the trailing major expansion diameter without deformation of said expansion section; and a reduced frangible breakneck section integrally joining the leading end of said bearing section of said fastener pin portion with the trailing end of said expansion section of said pintail portion, said bearing section and said expansion section defining a breakneck groove about said breakneck section, said breakneck groove having been closed by forcing the leading end of said bearing section and the trailing end of said expansion section into intimate contact with each other about the bearing and expansion surfaces during manufacture of said fastener and prior to use so that said closed breakneck groove appears as a line separation between said expansion and bearing surfaces, said bearing and expansion surfaces having been finished across the closed breakneck groove so that said expansion and bearing surfaces are essentially continuous across the closed breakneck groove to prevent any material of the work pieces about the holes from being removed in the closed breakneck groove as the closed breakneck groove passes through the holes while under expansion.

9. The fastener of claim 8 wherein said pintail portion further includes a pulling section integral with the leading end of said expansion section and coaxial therewith, said pulling section having a major outside diameter such that said pulling section will slidably pass through the holes at their initial diameter.

10. The fastener of claim 9 further including a dry film lubricant substantially covering said expansion surface and wherein said bearing surface defines a plurality of circumferentially extending irregularities therein generally normal to the fastener central axis.

11. A fastener with a central axis for connecting work pieces with aligned holes therethrough of an initial diameter while simultaneously coldworking the material of the work pieces about the holes where the work pieces have a common interface about the holes comprising:
a fastener pin portion including an elongate bearing section having a central axis and adapted to extend through the holes, and an enlarged head integral with the trailing end of said bearing section adapted to engage one side of the work pieces about the holes, said bearing section defining an exterior bearing surface thereon concentric about the fastener central axis, said bearing section having a length sufficient to extend through the holes when said fastener pin portion is installed with said head engaging one side of the work pieces, said bearing surface comprising a leading reverse taper subsurface and a trailing forward taper subsurface, said reverse taper subsurface and said forward taper subsurface defining a common juncture therebetween oriented generally normal to the fastener pin portion central axis, said reverse taper and forward taper subsurfaces sized so that said juncture is located substantially in registration with the interface between the work pieces about the holes when said fastener pin portion is installed in the holes, said reverse taper subsurface tapering inwardly along said bearing section from a leading major bearing diameter adjacent the leading end of said bearing section larger than the initial diameter of the holes in the work pieces to a trailing minor bearing diameter at said juncture trailing said leading major bearing diameter and smaller than said leading major bearing diameter by a first prescribed amount, and said forward taper subsurface tapering outwardly along said bearing section from the trailing minor bearing diameter at said juncture to a trailing major diameter at said head larger than the initial diameter of the holes; and a pintail portion integrally connected to the leading end of said bearing section of said fastener pin portion and having a central axis coaxial with the central axis of said fastener pin portion, said pintail portion including an expansion section defining an expansion surface on the leading portion thereof having a leading minor expansion diameter at least as small as the initial hole diameter and a trailing major expansion diameter larger than the leading major bearing diameter of said bearing surface and the initial diameter of the holes so that the expansion section non-elastically expands the material of the work pieces about the holes as the expansion section is forced therethrough to coldwork the material of the work pieces about the holes, the major expansion diameter selected to nonelastically expand the material of the work pieces about the holes so that the non-elastically expanded material of the work pieces recovers after the non-elastic expansion thereof toward a recovered diameter less than the leading and trailing bearing diameters of said fastener pin portion to cause the material of the work pieces about the holes to be forced into bearing contact with said reverse and forward tapered subsurfaces on said bearing section whereby said work pieces are constantly forced together, said pintail portion further including a reduced diameter frangible breakneck section integrally joining the leading end of said bearing section of said fastener pin portion with the trailing end of said expansion section of said pintail portion, said expansion surface and said bearing surface forming an essentially continuous surface across said frangible breakneck section.

12. The fastener of claim 11 wherein said breakneck groove has been closed by forcing the leading end of said bearing section and the trailing end of said expansion section into intimate contact with each other about the bearing and expansion surfaces during manufacture of said fastener and prior to use so that said closed breakneck groove appears as a line separation between said expansion and bearing surfaces, said bearing and expansion surfaces having been simultaneously finished across the closed breakneck groove so that said expansion and bearing surfaces are essentially continuous across the closed breakneck groove to prevent any material of the work pieces about the holes from being removed in the closed breakneck groove as the closed breakneck groove passes through the holes while under expansion.

13. The fastener of claim 12 wherein the trailing minor bearing diameter on said fastener pin portion is larger than the recovered diameter toward which the material of the work pieces about the holes tries to recover after non-elastic expansion thereof.

* * * * *